United States Patent
Cicero-Herman et al.

(10) Patent No.: US 6,329,563 B1
(45) Date of Patent: Dec. 11, 2001

(54) VITRIFICATION OF ION EXCHANGE RESINS

(75) Inventors: Connie A. Cicero-Herman, Aiken; Rhonda Jackson Workman, North Augusta, both of SC (US)

(73) Assignee: Westinghouse Savannah River Company, Aiken, SC (US)

( * ) Notice: Subject to any disclaimer, the term of this patent is extended or adjusted under 35 U.S.C. 154(b) by 0 days.

(21) Appl. No.: 09/354,864

(22) Filed: Jul. 16, 1999

(51) Int. Cl.$^7$ ........................................... G21F 9/00
(52) U.S. Cl. ................................................... 588/12
(58) Field of Search ............................ 252/628, 629; 588/7, 12, 13, 15, 16, 256; 501/1, 53, 55, 65, 68

(56) References Cited

U.S. PATENT DOCUMENTS

| | | | |
|---|---|---|---|
| 4,620,947 | * 11/1986 | Carlson | 252/628 |
| 4,632,778 | 12/1986 | Lehto et al. | 252/629 |
| 4,671,898 | 6/1987 | Hultgren | 252/628 |
| 4,696,768 | 9/1987 | Ali et al. | 252/628 |
| 4,793,947 | 12/1988 | Izumida et al. | 252/628 |
| 4,797,232 | * 1/1989 | Aubert | 252/629 |
| 5,288,435 | 2/1994 | Sachse et al. | 264/0.5 |
| 5,461,185 | * 10/1995 | Forsberg et al. | 588/11 |
| 5,662,579 | * 9/1997 | Bickford | 588/256 |

OTHER PUBLICATIONS

Grambrow, B., "Borosilicate Glass: Future Research Requirements or 'What We Don't Know'," *Chemical Abstracts*, 122:171927z (1995) p. 803; *MRS Bull.*, vol. 19, pp. 20–23.

Jantzen, C. et al., "Vitrification of Ion–Exchange (IEX) Resins: Advantages and Technical Challenges," *Chemical Abstracts*, 126:256410h; *Ceramic Trans.*, vol. 72, pp. 113–122 (1996).

Javed, K., "New Vitrification Technology is Being Considered for Waste Treatment," *Oversight News*, University of Kentucky—Kentucky Water Resources Research Institute, http://www.uky.edu/WaterResources/NEWS03.HTML.

Sargent, T. et al., "Operational Feasibility of the Vitrification of an Organic Ion Exchange Resin," *Chemical Abstracts*, 122:167733r; *Ceramic Trans.*, vol. 45, pp. 73–89 (1994).

Shirota, K., "Firing of Ceramic Materials Containing Lead Oxide at High Concentration," *Chemical Abstracts*, 125:17222w; JP 08–91946.

Speranzini, R. et al. "A Summary of Methods for Conditioning and Immobilizing Ion–Exchange Resins," *Chemical Abstracts*, 99:148183b (1983); *At. Energy Can. Ltd.*

Tajiri, J. "Denitridation of Molten Stainless Steel in Refining," *Chemical Abstracts*, 125:253933z (1996) p. 433; JP 08–209226.

Vitification Processes, DOE/EM–0190P, Aug. 1994.

Wicks, G., "Vitrification of Solid Waste," *Chemical Abstracts*, 122:141558n (1995) p. 587.

* cited by examiner

Primary Examiner—Stephen P. Griffin
Assistant Examiner—Eileen E. Nave
(74) Attorney, Agent, or Firm—Bruce D. Gray, Esq.; Kristin D. Mallatt, Esq.; Kirkpatrick Stockton LLP

(57) ABSTRACT

The present invention relates to vitrification of ion exchange resins that have become loaded with hazardous or radioactive wastes, in a way that produces a homogenous and durable waste form and reduces the disposal volume of the resin. The methods of the present invention involve directly adding borosilicate glass formers and an oxidizer to the ion exchange resin and heating the mixture at sufficient temperature to produce homogeneous glass.

16 Claims, No Drawings

VITRIFICATION OF ION EXCHANGE RESINS

The U.S. Government has rights in this invention pursuant to contract no. DE-AC09-89-SRI 8035 between the U.S. Department of Energy and Westinghouse Savannah River Company.

BACKGROUND OF THE INVENTION

1. Field of the Invention

This invention relates to vitrification of organic ion exchange resins into borosilicate glass, in particular into iron-enriched borosilicate glass, by adding borosilicate glass formers and a ferric oxide producer directly to the resins, forming a homogeneous and durable waste form. The invention results in significant volume reductions of the ion exchange resins.

2. Description of the Related Art

The commercial nuclear industry utilizes ion exchange resins to clarify their process and storage waters. The resins, which typically contain one or more backbone polymers and one or more functional groups, are used to remove unwanted impurities, such as radioactive materials or other contaminants, that could potentially harm the equipment or corrode reactor fuel rods. The resins can clarify water which is to be reused at or discharged from the plant, or that is to be stored on site. Often, significant quantities of liquids are treated in this way, creating large volumes of waste solutions. Ion exchange resins are used in several processes to remove both hazardous and radioactive constituents from these solutions or sludges, making disposal of the solutions or sludges easier. In reactor facilities, ion exchange resins are typically used for purification of water in reactor basins and fuel storage basins.

Over time, these resins have to be re-generated or replaced because there is an upper limit on the amount of material the resins can remove before they become fully loaded and ineffective. When this happens, the spent resins themselves become hazardous and/or radioactive waste requiring disposal. In many cases, the spent resins present disposal problems both because of the organic matrix itself and the radioactive and sometimes hazardous contaminants adsorbed thereon. Some of the radioactive contaminants that can be present include $Cs^{37}$, $Sr^{90}$, $Co^{60}$, $C^{14}$, $Mn^{54}$ and $Tc^{99}$. In the United States, resin wastes from Boiling Water Reactors (BWR) are enriched in constituents such as $Fe_3O_4$, while wastes from Pressurized Water Reactors (PWR) are enriched in borate from moderators and in Li, from pH control compounds. Approximately 100,000 lbs. of BWR and 30,000 lbs. of PWR spent resins are generated per year per commercial reactor in the United States.

Resins for removing Cs from Department of Energy (DOE) high level waste (HLW) are being investigated by several DOE sites. A resorcinol resin was originally proposed for use in removing the Cs from HLW supernate. If the use of these resins is implemented, a disposal method suitable for several thousand pounds of spent resin will be needed. Divinylbenzene/styrene copolymer resins are used by reactor facilities, including those at the Savannah River Site (SRS), to purify fuel rod storage basin water.

The widespread use of ion exchange resins in the nuclear industry, which shows every sign of continuing into the future, has resulted in a need for a cost-effective method for disposing of spent resins. Disposal methods can be analyzed into two subparts: volume reduction and immobilization.

Various methods exist in the art for reducing the volume of these resins and for immobilizing them. U.S. Pat. No. 4,671,898 discloses converting a spent, radioactive ion exchange resin into a stable cement product having reduced volume. U.S. Pat. No. 4,632,778 discloses a procedure for transforming radioactive waste bound to an inorganic ion exchanger, yielding a ceramized product. U.S. Pat. Nos. 4,793,947 and 5,288,435 disclose vitrifications of radioactive waste products requiring pretreatment prior to vitrification.

Vitrification has been shown to be a feasible treatment method for ion exchange resins. The organic compounds which make-up the matrix of the resins can be destroyed either by pyrolysis or combustion at typical vitrification temperatures. Some of the heavier organic compounds are pyrolyzed within the melt. The majority of the combustion usually occurs above the melt in the plenum or in a secondary combustion chamber. The goal is to reduce the volume of the total waste, while at the same time providing a durable, immobilizing medium for the radioactive and/or hazardous species.

An independent study performed by the Electric Power Research Institute (EPRI) determined that a significant return on investment capabilities was possible by applying vitrification technology to the treatment of spent ion exchange resin. Another important determination was that implementation of the technology would give insurance to reactor operators that operations could continue even if regional compacts for low level waste disposal were delayed.

However, vitrification of organic ion exchange resins presents a challenge because of the high organic content of the resins and the volatile $Cs^{137}$ that is usually present. High organics tend to induce reducing environments in melters, which can result in the reduction of metals in the waste, and separation of the metals from the bulk glass matrix, defeating at least one of the goals of vitrification. Alloying of the reduced metals with the melter electrodes or corrosion of other melter components can also be a problem, reducing the useful life of the treatment equipment. Organics can also result in reduced glasses, which have been shown to have poorer durability compared to glasses of the same composition that are oxidized or less reduced. X. Feng, I.L. Pegg, E. Saad, S. Cucinell, and A. A. Barkatt, "Redox Effects on the Durability and Viscosity of Nuclear Waste Glasses", Nuclear Waste Management IV, 23. $Cs^{137}$ has been shown to be extremely volatile at high temperatures. Stabilization of this contaminant in the glass matrix without excessive volatilization presents a challenge which must be met if the waste is to be successfully stabilized.

Past attempts to vitrify ion exchange materials have been only moderately successful from the standpoints of waste loading and volume reduction, and have required additional pretreatment steps. Without pre-treatment, waste loadings and volume reductions have been very limited. A general maximum guideline for waste loading in the glass industry is approximately 20 weight percent. At this waste loading, final wasteform volume usually increases. Using pre-treatment methods (such as wet acid oxidation disclosed in U.S. Ser. No. 08/861,483, filed May 22, 1997 the entire contents of which are hereby incorporated by reference), these processes can result in volume reductions when the resin structure is broken down. The disadvantage of pre-treatment is that extra processing steps and equipment are required. Thus, there are more up-front capital costs and everyday supply costs. These costs are multiplied by the need to use equipment and procedures suitable for handling radioactive material. In addition, the requirement for pre-treatment would extend the treatment time required. Most pre-treatment steps involve some form of chemical oxidation or treatment, which will require control of the radioactive and hazardous materials associated with the resin (e.g. creating a Cs volatility concern). As a result, there exists a need for a method of directly vitrifying organic ion exchange resins in order to reduce the volume of the resin waste and produce a durable and stable waste form. It is one object of the present invention to provide such a process.

More specifically, it is an object of the present invention to provide a process for vitrifying an organic ion exchange resin without pretreatment of the resin.

It is another object of the invention to provide a process for converting organic ion exchange resins into homogeneous and durable waste forms of iron-enriched borosilicate glass. More specifically, it is an object of the present invention to vitrify these resins directly by adding borosilicate glass formers and a ferric oxide producer to aid in oxidation reactions that remove organic materials during melting.

It is another object of the invention to provide a process for converting organic ion exchange resins into homogeneous and durable waste forms of iron-enriched borosilicate glass by adding ferric nitrate as a ferric oxide producer, where the ferric nitrate provides nitrates to help oxidize the organic materials.

SUMMARY OF THE INVENTION

These and other objectives are achieved by the presently claimed invention, which is directed to a process of vitrifying an organic ion exchange resin by adding borosilicate glass formers and an oxidizer to form a glass forming mixture in order to produce a homogeneous and stable waste form. The glass forming mixture is heated to a temperature and for a time sufficient to form a melt, then cooled to form a vitreous solid. The oxidizer that is added may either be a ferric oxide producer, such as ferric nitrate, or ferric oxide itself, or mixtures thereof and it is added in an amount sufficient to oxidize the resin.

The present invention is also directed to a glass composition containing the immobilized waste material, and comprising about 8 wt % to 16 wt % $B_2O_3$, about 10 wt % to 15 wt % CaO, about 16 wt % to 22 wt % $Fe_2O_3$, about 8 wt % to 14 wt % $Na_2O$, about 41 wt % to 49 wt % $SiO_2$.

In another embodiment, the present invention is also directed to a glass composition where $Ca(OH)_2$ is used as the starting material for the CaO glass former, instead of the more common $CaCO_3$. In this embodiment, a combination of ferric oxide and ferric nitrate is typically used as the ferric oxide producer.

The present invention can be more clearly understood by reference to the following Detailed Description of Specific Embodiments, which is not intended to limit the scope of the appended claims.

DETAILED DESCRIPTION OF SPECIFIC EMBODIMENTS

The present invention involves the formation of a vitreous solid that immobilizes volume-reduced radioactive and hazardous waste from ion exchange resins without the need for pretreatment of the resin. The resin is combined with borosilicate glass forming compounds, such as hydrous borax (forming $B_2O_3$ and $Na_2O$), calcium carbonate or calcium hydroxide (forming CaO), sodium nitrate (forming $Na_2O$), and silica ($SiO_2$), and with a ferric oxide producer (either $Fe_2O_3$ or $Fe(NO_3)_3$), heating this mixture to vitrification temperature, which is typically a temperature between about 1050° C. and 1150° C., then cooling to form a vitreous solid The temperature is limited to 1150° because radioactive waste vitrification studies have shown that Cs volatility increases above 1150° C. Cooling rate in a melter is equivalent to the cool down as the glass exits the melter and deposits in a canister. During the melter studies, the cooling rate was not measured or controlled. The glass was air-cooled to the surrounding environment. In lab studies, the cooling schedule from the Defense Waste Processing Facility (DWPF) high-level waste glass canisters was used as a conservative slow cooling test and no crystallization problems were found in the glass.

In a specific embodiment of the invention, the ferric oxide producer is typically added in an amount between about 16 and about 22 wt %, based on the desired amount of vitreous glass oxides. In this specific embodiment, the borosilicate glass formers contain about 8 to about 16 wt % $B_2O_3$ (typically added as hydrous borax), about 10 to about 15 wt % CaO (typically added as $CaCO_3$ or $Ca(OH)_2$), about 8 to about 14 wt % $Na_2O$ (typically added as $NaNO_3$ or $NaCO_3$), and about 41 to about 49 wt % $SiO_2$. The process is carried out by directly vitrifying the glass forming mixture without pretreatment of the ion exchange resin, and achieves waste loadings of about 27.5% to about 41.2% and volume reductions of about 28% to about 76%. Resin amounts are based on the mass of resin waste that is introduced per mass of vitreous solid oxides. Waste loadings are calculated by dividing the weight of resin introduced by the sum of the weight of the glass produced and the introduced waste. For example, a waste loading of 27.5% would be a glass containing 38 grams of resin waste per 100 grams of glass produced.

In other words, the waste is added to the borosilicate glass formers in an amount ranging from about 38 grams resin to about 70 grams resin, based on 100 grams vitreous solid. The redox ratio ($Fe^{2+}/\Sigma Fe$) typically is less than 0.33, which is considered an oxidized glass, more particularly between about 0.10 and about 0.33.

Using direct vitrification methods, early studies at SRTC indicated that the maximum amount of resorcinol resin that could be incorporated in the glass matrix was 5 grams of resin per 100 grams of glass produced, while the maximum amount of AMBERLITE (styrene-divinylbenzene resin) that could be incorporated in the glass matrix was 20 grams of resin per 100 grams of glass produced. The waste loadings were believed to be mainly limited by the redox ($Fe^{2+}/\Sigma Fe$) of the glass. These findings have been verified with bench-scale vitrification studies and lab-scale melter studies. Vitrification of the resorcinol resin in DWPF type feed was found to be plausible, and melter operating conditions were not greatly affected by the resin components. Glasses made with the resin were found to have slightly poorer durability because of the higher redox ratio of the glass. However, the durability was still significantly better than the Environmental Assessment (EA) glass durability results, which is the benchmark for high-level waste glasses when subjected to the Product Consistency Test (PCT). ASTM C1285–94, "Standard Test Methods for Determining Chemical Durability of Nuclear Waste Glasses: The Product Consistency Test (PCT)", February 1995.

It has been found that the presence of nitrates helped lower the redox ratio, permitting greater amounts of organics to be treated per gram of glass produced. Waste loadings have been achieved using the present invention that are considerably higher than those previously achieved. Studies with Argentine and commercial nuclear industry ion exchange materials using this information successfully stabilized high quantities of organic ion exchange resins in an iron-enriched borosilicate glass formulation.

In laboratory studies using the process of the invention, six resins typical of the Argentine nuclear industry and six resins typical of the United States' commercial nuclear industry were tested. The Argentine resins were all polystyrene-divinylbenzene based resins, but had different ionic forms. The commercial nuclear industry resins, on the other hand, were mostly styrene based resins, but had different active groups and ionic forms. Overall, the resins behaved the same during melting, but some of the ionic forms (e.g., Cl) and active groups (e.g., sulphonic acid) had limited waste loading because of their solubility in glass. Table 1 shows the resins tested, along with their matrix, active groups, ionic forms, and manufacturers.

the 1150° C. heat treatment, (i.e. 99–100% mass loss). This indicates that high waste loadings with these materials are achievable in a glass matrix and that the resin components should not greatly affect the glass composition. Therefore, waste loadings would only be limited by processing constraints or by limits on the resin contaminants (e.g. Cs solubility or radiation field). "Radiation field" refers to the radioactive dose associated with the Cs and other radioactive materials in the glass. It is necessary to limit radioactive content because of potential radioactive dose to the workers and the surrounding environment. In addition, the radioactive content of the final product will dictate the type of disposal necessary, so this is a consideration when determining the maximum waste loading.

A standard method for determining the feasibility of vitrification treatment for a particular waste stream is to

TABLE 1

| Resin | Matrix | Active Group | Ionic Form | Manufacturer |
|---|---|---|---|---|
| S100 | Polystyrene | Sulphonic Acid | $Na^{2+}$ | Lewatit |
| M500 | Polystyrene | Quaternary Amine | $Cl^-$ | Lewatit |
| IRN-77 | Polystyrene/DVB | Sulphonic Acid | $H^+$ | Rohm & Haas |
| IRN-78 | Polystyrene/DVB | Quaternary Ammonium Type II Alkyl | $OH^-$ | Rohm & Haas |
| IRN-150 | Polystyrene/DVB | Mix of IRN 77 & 78 | H/OH | Rohm & Haas |
| IRN-154 | Polystyrene/DVB | Mix of IRN 77 & 78 | Li/OH | Rohm & Haas |
| A-550 | Polystyrene/DVB | Quaternary Ammonium Type II Alkyl | $CL^-$ | Ionic |
| IRC-50 | DVB | Carboxylic Acid | $H^+$ | Rohm & Haas |
| 21H | Polystyrene/DVB with cellulose fiber | Sulphonic Acid/ Trimethylamine | H/OH | unknown |
| 900-OH | Polystyrene/DVB | Quaternary Ammonium Type I Alkyl | $OH^-$ | Rohm & Haas |
| 200-H | Polystyrene/DVB | Sulphonic Acid | $H^+$ | Rohm & Haas |
| 650-C | Polystyrene/DVB | Sulphonic Acid | $H^+$ | Dow Chemical |

The amount of the resin material that will remain undecomposed at typical vitrification temperatures is an important parameter influencing the proper amount of glass additives to be used. Some wastes that are vitrified will contribute a large portion of the glass structure components, whereas other wastes, like the resins vitrified in the present invention, are thermally decomposed and only contribute a small portion. For wastes like resins, a glass formulation can be determined that will only be slightly affected by the presence of the waste. Several techniques were used to measure the weight loss behavior with temperature for the different resins. This data was used to estimate material loss for the resins when vitrified at typical glass melting temperatures.

Typically, vitrifiable wastes are dried at a temperature of around 100° C. to determine the water loss or dried solids content. Subsequent drying at temperatures of around 600° C. and 1150° C. are also performed to determine the loss of other species and the cation content. Solids remaining on drying at 1150° C. should also remain in the glass structure when the waste is treated.

A large mass loss was not seen for most of the resins at 100° C. All the resins lost at least 80% of their mass at 600° C. For all of the resins, the structure was completely broken down and almost no remnants of the resins remained after perform bench-scale (crucible-scale) vitrification studies on surrogate wastes. These studies are used to determine optimum vitrification processing parameters (e.g. melt temperature and residence times) and the necessary glass additives. These results can then be used to study laboratory scale treatment of the actual wastes or to perform melter demonstrations with either surrogate or actual wastes.

The nominal glass composition tested was 9 wt % $B_2O_3$, 15 wt % CaO, 22 wt % $Fe_2O_3$, 8 wt % $Na_2O$, and 46 wt % $SiO2$. In this study, base compositions were fabricated from reagent grade chemicals with $Fe(NO_3)_3$ used as the ferric oxide former to help oxidize the organics. This glass easily melted at 1150° C., which was beneficial in trying to avoid volatilizing the Cs that is normally contained on the spent resins.

The commercial nuclear industry resins were mixed with the necessary glass additives, slowly heated (~10° C./min) to melt temperature (about 1150° C.), melted for four hours, removed from the furnace, and then allowed to cool to room temperature in the crucibles. In all tests, covered high purity alumina crucibles were used to melt the glasses. After cooling to room temperature, the glasses produced were examined for completeness of reaction, visual homogeneity, and presence of metal sulfides.

Successive testing with the resins involved slowly increasing or decreasing the amount of resin until problems with processing, salt layer formation, visual homogeneity, or metal sulfide formation were not a concern. In some cases, the batch materials were allowed to react in the crucible before melting to allow complete oxidation of the resin to occur (reflected as "R" in the Glass ID in Table 2, below).

Most of the resins produced black-brown or black homogeneous glasses. However, in a few instances, small pellets were found in the glass matrix that easily separated from the glass matrix and disintegrated when crushed. These pellets were examined using Scanning Electron Microscopy (SEM) coupled with Energy Dispersive Spectroscopy (EDS). They were determined to be iron sulfide pellets, which have been shown to form when glasses become too reduced. Therefore, glasses which produced these pellets were not considered acceptable, and either the waste loading was lowered or the reaction time for the $Fe(NO_3)_3$ and the resin was increased. The strong cation sulfonated styrene resins seemed to have the most problems with formation of metal sulfides and incorporation of high waste loadings. No problems with salt formation on the glass surface were seen for any of the resins.

The resin waste loading varied from 38–70 g/100 g vitreous product or 27.5–41.2 wt % for the maximum loaded homogeneous glasses. Waste loadings and qualitative descriptions of various glass foundations tested are given below in Table 2. For the Glass ID, the number associated with each resin type was used, and the number following the hyphen represents the grams of resin added per 100 grams of glass produced.

TABLE 2

RESIN LOADINGS TESTED

| Glass ID | Waste Loading | Description |
|---|---|---|
| 550-42 | 29.6% | Dark brown glass |
| 550-46 | 31.5% | Black glass |
| 550-50 | 33.3% | Black-brown glass |
| 550-54 | 35.1% | Black-brown glass |
| 50-42 | 29.6% | Dark brown glass |
| 50-46 | 31.5% | Black glass |
| 50-50 | 33.3% | Black-brown glass |
| 50-54 | 35.1% | Black-brown glass |
| 21-42 | 29.6% | Dark brown glass |
| 21-46 | 31.5% | Black glass |
| 21-50 | 33.3% | Black-brown glass |
| 21-54 | 35.1% | Black-brown glass |
| 21-58 | 36.7% | Black-brown glass |
| 21-62 | 38.3% | Black-brown glass |
| 21-66 | 39.8% | Black glass |
| 900-42 | 29.6% | Dark brown glass |
| 900-46 | 31.5% | Black glass |
| 900-50 | 33.3% | Black-brown glass |
| 900-54 | 35.1% | Black-brown glass |
| 900-58 | 36.7% | Black-brown glass with some shiny particles on the surface |
| 900-62 | 38.3% | Black-brown glass, some unreacted material on one side of crucible line |
| 900-66 | 39.8% | Black-brown glass |
| 900-70 | 41.2% | Black glass |
| 900-74 | 42.5% | Rough black glass on surface, black glass underneath, metallic on sides |
| 200-34 | 25.4% | Black glass |
| 200-38 | 27.5% | Black glass |
| 200-38-R | 27.5% | Reacted ~16 hrs, black-brown glass |
| 200-40 | 28.6% | Unreacted surface with black glass underneath, small pellet in glass |
| 200-42 | 29.6% | Black glass under matted surface, small metal pellet in glass |
| 650-32 | 24.2% | Unreacted at surface with orange and blue streaks, black glass underneath |
| 650-34 | 25.4% | Brown glass with orange streaks at surface, metals in glass |
| 650-38 | 27.5% | Black glass, small metal pellet |
| 650-38-R | 27.5% | Reacted ~16 hrs, unreacted surface, black glass underneath |
| 650-38-RR | 27.5% | Reacted ~16 hrs and melted 6 hrs, black glass |
| 650-42 | 29.6% | Dark brown glass with small metal pellet in glass |

After visual examination, several of the resin glasses were analyzed to determine the glass redox ratio. This is an important property for these glasses because of the high organic content of the wastes. Since it is likely that the production-scale processing of the resins would occur in a Joule-heated vitrification unit, an acceptable redox ratio was considered to be between 0.10 and 0.33 for $Fe^{2+}/\Sigma Fe$, which is consistent with the operational limits established for the DWPF melter. D. F. Bickford, A. A. Ramsey, C. M. Jantzen, and K. G. Brown, "Control of Radioactive Waste Glass Melters: 1, Preliminary General Limits at Savannah River", J. Am. Ceram. Soc., 73 [10], 2896–2902 (1990).

The $Fe^{2+}/\Sigma Fe$ ratio was determined by the SRTC Mobile Laboratory for several of the glasses using the calorimetric method. As mentioned above, high ratios are not desirable in glass melters due to the potential to reduce elemental or metal oxides in the wastes to pure metals or sulfides, which can settle to the bottom of the melter or interact with melter components, such as electrodes. Theoretically, the measured ratio should be higher for glasses with higher resin loading because of the higher organic content. The $Fe^{2+}/\Sigma Fe$ ratios determined for several of the resin glasses are given in Table 3. The base glass (without resin added) redox ratio was previously determined to be 0.054.

TABLE 3

MEASURED REDOX RATIOS

| Glass ID | $Fe^{2+}/\Sigma Fe$ Ratio | Glass ID | $Fe^{2+}/\Sigma Fe$ Ratio |
|---|---|---|---|
| 550-42 | 0.054 | 900-42 | 0.055 |
| 550-50 | 0.259 | 900-54 | 0.039 |
| 550-54 | 0.715 | 900-66 | 0.074 |
| 50-42 | 0.047 | 900-70 | 0.124 |
| 50-50 | 0.119 | 200-34 | 0.502 |
| 50-54 | 0.540 | 200-38 | 0.532 |
| 21-42 | 0.040 | 200-38-R | 0.269 |
| 21-54 | 0.033 | 650-42 | 0.673 |
| 21-62 | 0.054 | 650-38 | 0.519 |
| 21-66 | 0.398 | 650-38-RR | 0.330 |

All of these glasses were considered oxidized with measured redox ratios ($Fe^{2+}/\Sigma Fe$) of less than 0.33. This limit is consistent with the operational limits established for the DWPF melter. The redox results indicated that the resins with sulphonic acid as the active group were limited the most in waste loading. When the waste loading was too high for these resin glasses, metal sulfides formed in the matrix and the glasses did not appear homogeneous.

For the 21H and 900-OH resin glasses (described in Table 1), the measured redox ratio was not strongly affected by the amount of resin present in the glass. Only a slight increase in the ratio occurred as the amount of resin increased, so very large quantities of the resins could be incorporated in the glass structure. The redox ratios of the 200-H and 650-C resin glasses, on the other hand, were very dependent on the amount of resin present in the glass. A large affect on the redox ratio is shown, even at the low amounts, compared to the base glass redox ratio of 0.054. The glass redox ratio strongly affected the ability of the glass to incorporate the resin and make homogeneous glass. The benefits of longer resin and $Fe(NO_3)_3$ reaction times are seen with the redox ratios of the 200-H and 650-C resin glasses. Glasses with the same resin loadings and longer reaction times had substantially lower measured redox ratios. For the A-550 and IRC-50 resin glasses, the redox ratio gradually increased and became a limiting factor at the 54 gram loadings.

Based strictly on the redox ratio results, the optimum waste loadings for the resins would be 50 grams of resin/100 grams of glass for the A-550 and IRC-50 resins, 62 grams of resin/100 grams of glass for the 21 H resin, 70 grams of resin/00 grams of glass for the 900-OH resin, and 38 grams of resin/100 grams of glass for the 200-H and 650-C resins. If the redox ratio was found to be acceptable, the glass was further characterized for chemical composition, crystalline content, and durability.

The optimum waste loading glasses were analyzed for chemical composition and selected results provided below in Table 4. The analyses were performed after $Na_2O_2$—HCl dissolution and microwave digestion using Inductively Coupled Plasma-Emission Spectroscopy (ICPES). The glass compositions should be fairly consistent between glasses because the resin solids contribute only a minor amount of material to the glass composition. The analyzed compositions were compared to the base glass composition without resin so the effects of the resin addition could be better quantified.

TABLE 4

GLASS CHEMICAL COMPOSITIONS RESULTS (Wt %)

| Glass ID | $Al_2O_3$ | $B_2O_3$ | CaO | $Fe_2O_3$ | $Na_2O$ | $SiO_2$ |
|---|---|---|---|---|---|---|
| Base | 1.848 | 9.174 | 14.565 | 20.308 | 8.096 | 44.162 |
| 50-50 | 4.182 | 14.676 | 11.471 | 17.162 | 9.660 | 38.188 |
| 550-50 | 5.105 | 14.459 | 11.268 | 15.772 | 10.707 | 36.823 |
| 21-62 | 2.078 | 15.734 | 11.863 | 17.734 | 10.302 | 39.865 |
| 900-70 | 4.856 | 15.508 | 11.081 | 17.541 | 9.953 | 39.683 |
| 200-38-R | 6.289 | 13.971 | 9.904 | 16.928 | 8.931 | 38.018 |
| 650-38-RR | 8.305 | 14.558 | 9.931 | 15.936 | 9.668 | 37.315 |

The resin glasses were very similar in composition, but were slightly different from the base glass composition. The glasses contained some amount of $Al_2O_3$ contamination from the $Al_2O_3$ crucibles used in melting. Higher $Al_2O_3$ contamination seemed to be present in the glasses that were allowed to react before melting. The reaction refers to the amount of time that the additives and the resin were allowed to sit in the crucible before heat-up in the furnace and melting occurred. Normally, the resin is added to the glass formers and then added immediately to the furnace for melting. Any significant reaction times prior to placing the compositions in the furnace are noted in Table 2. Since some of the organic break-down occurs as a result of the ferric nitrate additive and not just the melting, the longer the batch materials are co-mingled, the more the break-down will occur. In the melter, this can be controlled by the amount of time that the material sits in the feed vessel before being added to the melter. Melts with the iron-enriched borosilicate composition and resin in platinum crucibles have verified that the $Al_2O_3$ was not important for glass formation.

However, materials of construction for the melter will have to be selected with the realization that some $Al_2O_3$ may be removed and incorporated into the glass matrix. Higher $Al_2O_3$ contamination was also seen for the resin-containing glasses, which contributes to the slight difference in composition from the base glass, since higher concentrations of one species would dilute the other major species in the glass. It also appears that the resin glasses were slightly higher in $B_2O_3$ and $Na_2O$ than the base glass composition, which may indicate that the borax additive amount may have been higher than necessary, since borax contributes both of these oxides to the melt. This is possible because waters of hydration are associated with the borax and different forms of borax may have been used when the base glass and these glasses were melted at a different time. For the batch calculations, ten waters of hydration were assumed, so if a different form of borax was used, then higher amounts of $B_2O_3$ and $Na_2O$ in the glass would be possible. Overall, the type of resin did not seem to greatly impact the glass composition.

All glasses appeared to be visually homogeneous upon cooling. In order to ensure that no crystalline phases were present, X-Ray Diffraction (XRD) analyses were performed on the optimum waste loading glasses. All glasses were found to be amorphous.

To determine the final product durability, the PCT, ASTM C1285–94 was performed on the optimum waste loading glasses. The PCT is a crushed glass leach test that measures the releases of B, Si, Na, and other elements in 90° C. ASTM Type I water over a period of seven days. ASTM C1285–94, "Standard Test Methods for Determining Chemical Durability of Nuclear Waste Glasses: The Product Consistency Test (PCT)", February 1995. Glass samples were run in triplicate for the PCT and the results were averaged and normalized. The normalized PCT results are given in Table 5. The measured leachate pH is also listed, since this provides a secondary indication of durability. The PCT for the base glass composition is given for comparison. Since no acceptance criteria have been established for waste glasses other than HLW glasses, the durabilities of the glasses produced were compared against the HLW criteria which states that the glass produced must be more durable than the EA glass. The accepted values are given in Table 5.

TABLE 5

NORMALIZED PCT RESULTS (g/L)

| Glass ID | B | Si | Na | pH |
|---|---|---|---|---|
| Base | 0.16 | 0.07 | 0.27 | 9.66 |
| 550-50 | 0.22 | 0.07 | 0.50 | 10.16 |
| 50-50 | 0.19 | 0.07 | 0.41 | 10.05 |
| 21-62 | 0.17 | 0.07 | 0.31 | 9.87 |
| 900-70 | 0.19 | 0.06 | 0.48 | 10.11 |
| 200-38-R | 0.25 | 0.07 | 0.99 | 10.59 |
| 650-38-RR | 0.23 | 0.08 | 0.90 | 10.64 |
| EA | 16.695 | 3.922 | 13.346 | 11.85 |

The PCT results were fairly consistent between the different glasses with the different resin types. Most of the glasses had similar elemental releases to the base glass formulation, with Na releases that were slightly higher. The results also indicated that the presence of the resin had little affect on the glass durability performance. The pH results from the PCT also indicated that the glasses had similar durabilities. No apparent trend was observed between the amount of resin in the glass and the PCT release; however a slight increase in B and Na release was seen for the glasses with the higher redox ratios. All glasses had excellent durability compared to the EA glass based both on the normalized releases and on the measured pH. The normalized releases for all glasses were orders of magnitudes less than the EA glass.

Based on all of the analytical results, the glasses that were selected as having the optimal waste loading were homogeneous and very durable glasses. The iron enriched borosilicate glass formulation seemed well suited for incorporating these wastes when ferric nitrate is used as the source of iron in the glass formulation.

The optimum compositions, as shown in Table 6, were also used to melt doped resin glasses. Dopants used were based on the radioactive contaminants typically found in the Argentine and United States commercial nuclear industry. Analyses have shown that the principal radioactive isotopes of concern were $C^{60}$, $Cs^{137}$, $Cs^{134}$, and $Sr^{90}$ of the Argentine nuclear industry. The reference for Argentine contaminants is from a presentation given by the Argentine Nuclear Energy Commission at the second Joint Coordinating Committee for Radioactive and Mixed Waste Management Meeting which occurred in Argentina in November 1996. The principle radioactive isotopes of concern were $Mn^{54}$, $Co^{60}$, $Cs^{134}$, and $Cs^{137}$ for United States commercial nuclear industry resins. B. A. Weber, "Direct Vitrification of Fermi 2 Bead Resin", Presented at the Electric Power Research Institute-Vitrification of Low-Level Waste Meeting, San Antonio, Dec. 5–6, 1995. Higher levels of dopants had to be used because of the small amounts of resins that were used in the tests. The actual amounts of the isotopes only equated to very small gram quantities of the elements, which would have been difficult to detect in the glasses when they were analyzed.

TABLE 6

RADIOACTIVE CONTAMINANT CONCENTRATIONS (mCi/g)

| Isotope | Actual Amount | Dopant Amount |
|---|---|---|
| $Mn^{54}$ | $5.4 \times 10^{-4}$ | $5.4 \times 10^{4}$ |
| $Co^{60}$ | $5.8 \times 10^{-4}$ | $5.8 \times 10^{8}$ |
| $Cs^{134}$ | $6.2 \times 10^{-4}$ | $6.2 \times 10^{5}$ |
| $Cs^{137}$ | $7.9 \times 10^{-4}$ | $7.9 \times 10^{2}$ |

Non-radioactive compounds were used as the dopants. These compounds were dissolved in 10 mL of water and mixed with an amount of resin equal to the optimum waste loading for each resin glass. The resins were then mixed with the glass additives and melted at 1150° C. for 4 hours. Once again, the glasses were allowed to cool to room temperature and were then visually examined. The glasses were analyzed for the radioactive element content so the radioactive retention could be determined. The retention numbers are important for determining the amount of radioactive isotopes that will volatilize and have to be captured by the offgas system, and are given in Table 7, below.

TABLE 7

CALCULATED RETENTIONS FOR GLASSES

| Glass ID | Cs | Mn | Co |
|---|---|---|---|
| 550-50 | 73.1% | 89.1% | 83.3% |
| 50-50 | 73.5% | 81.1% | 76.9% |
| 21-62 | 76.9% | 83.5% | 81.1% |
| 900-70 | 100% | 84.8% | 84.2% |

TABLE 7-continued

CALCULATED RETENTIONS FOR GLASSES

| Glass ID | Cs | Mn | Co |
|---|---|---|---|
| 200-38 | 70.3% | 83.3% | 86.4% |
| 650-38 | 72.2% | 87.1% | 79.0% |

Information found on other contaminants indicated that iron and sodium may also be present on spent resins. However, since both of these are components of the glass matrix, their presence should not affect the glass forming ability of this waste stream using this glass composition. Thus, no additional amounts of these materials were added to the resins to determine the incorporation ability.

The dopant amounts represented levels six to twelve orders of magnitude higher than what has actually been found in industrial resins. All glasses melted with doped resins appeared to be visually homogeneous with no apparent effect on melt behavior or glass formation. The calculated radioactive element retentions were 72–100% for Cs, 81–89% for Mn, and 76–86% for Co.

Calculated retentions were fairly consistent from glass to glass. The calculated retentions were consistent with other vitrification processes. One possible explanation for the seemingly low retention values may be the uncertainty about the amount of glass produced. In order to calculate the radioactive material retained in the glass, the total amount of glass produced is used in conjunction with the weight percent of the element found in the glass. During these experiments, the actual weight of glass produced was not measured, but was calculated based on the oxide content of the feed. If the oxide estimate is biased low, then the calculated retentions would also be biased low. Another factor which may have decreased the calculated retentions was the fact that the radioactive surrogates were not processed through a resin column as would be done in practice. Surrogate compounds were dissolved in water and then mixed with the resin, so it is highly likely that the materials were not adsorbed as well as they would be in a resin column and the amount of radioactive material adsorbed on the resin was actually lower than targeted. During the studies, it appeared that most of the Mn and some Co did not adsorb on the resin. With the radioactive materials strongly bonded to the resin, the retentions would be expected to be even higher.

Because most of the calculated retentions were less than 90%, an offgas system should be utilized in order to capture these materials. Given that the dopant amounts were orders of magnitudes higher than what has actually been found in industry resins, the amount of material that would be released to the offgas system would be very small.

Based on the studies performed with the six resins representative of commercial industry resins, it appears that using a base glass composition consisting of 9.1 wt % $B_2O_3$, 14.8 wt % CaO, 22.2 wt % $Fe_2O_3$, 8.1 wt % $Na_2O$, and 45.8 wt % $SiO_2$ will produce very durable and homogeneous glasses. When using this formulation, ferric nitrate should be used as the source of $Fe_2O_3$ to help with the organic destruction.

For the resins, different optimum waste loadings were determined. The optimum waste loading was strongly dependent on the type of resin being vitrified. The waste loadings ranged from 38 to 70 grams of resin/100 grams of glass produced. The associated volume reductions were 28.0–68.3%. These waste loadings and associated volume reductions are higher than what has been seen in previous studies with resin treatment when the iron-enriched borosilicate glass formulation was not used. The resins that were the most difficult to vitrify were the strong cation sulfonated styrene resins.

Calculated radioactive material retention varied from 70.3–100% for Cs, 81.1–89.1% for Mn, and 76.9–86.4% for Co. Although some of the radioactive surrogates were not retained in the glass matrix, the vitrification process can be coupled with an offgas system capable of capturing radioactive species in order to increase the effective retention of the process.

In order to determine the potential volume reduction of using vitrification treatment on these resins, volume reduction calculations were performed for each resin type given the optimum waste loadings. To do this, the bulk density of each resin was measured and the measured glass density were used. The calculated volume reductions varied from 28 to 68%, and are given below in Table 8.

TABLE 8

CALCULATED VOLUME REDUCTIONS

| Resin | Waste Loading | Volume Reduction |
|---|---|---|
| A-550 | 50 g/100 g | 55.9% |
| IRC-50 | 50 g/100 g | 55.9% |
| 21-H | 62 g/100 g | 63.5% |
| 900-OH | 70 g/100 g | 68.3% |
| 200-H | 38 g/100 g | 34.0% |
| 650-C | 38 g/100 g | 28.0% |

When the resins are disposed of, they usually have an associated volume of water that requires disposal, which may be absorbed in the resin matrix. Volume reductions for resins that have associated water will be higher because of this extra water, which is evaporated during the vitrification process. Past studies with resins used in similar applications have shown as much as two times the volume of water being associated with a given volume of resin when it is ready for disposal.

In another embodiment of the present invention, $Ca(OH)_2$ is used as a glass-forming additive, instead of $CaCO_3$, in order to minimize foaming in the melter. Using $Ca(OH)_2$ also allows for either higher resin loadings or reduced nitrate emissions, since ferric nitrate reacts with $CaCO_3$. When $Ca(OH)_2$ is used, substitution of some ferric oxide for the ferric nitrate results in nitrate emissions that are reduced proportionally with the substitution. The resin loading with $Ca(OH)_2$ would vary with the particular resin, and melter demonstrations showed that the glass was very highly oxidized when the hydroxide was used instead of carbonate. This implies that higher amounts of resin could be added since the redox state of the glass was usually the limiting factor for waste loading. It is anticipated that an additional 2 wt % would easily be accommodated.

For a given waste loading, ⅔ of the ferric nitrate could be substituted by ferric oxide and still produce acceptable glass with the calcium hydroxide additive. To be conservative, the limit should probably be about half of the $Fe_2O_3$ content. This should reduce $NO_x$ emissions in half. During our studies, successive reductions were performed to determine optimum ferric nitrate levels.

To ensure the viability of the glass composition for waste treatment, two melter demonstrations were performed. Both used the iron-enriched borosilicate glass composition; however, one used a divinyl benzene polystyrene based resin, while the other used a methacrylic acid based styrene resin.

These demonstrations were performed in a small-scale Inconel Stir-Melter®. The melting temperature was limited to approximately 1050° C. A little over a melter volume of glass was produced in each demonstration. For the demonstrations, the upper limit of the $Na_2O$ range was used to help lower the glass viscosity (all other additives are proportionally reduced especially $SiO_2$). Since the Inconel melter is limited in temperature, glass viscosity must be lower to allow for easier processing.

In the demonstrations, homogeneous and durable glasses were produced. The glass produced was much more oxidized than what was seen in the crucible studies. This was likely due to the oxygen that was being sparged into the melter. Some problems with foaming were seen in the demonstrations. In the first demonstration, the foaming was seen in the feed tank, which was attributed to reactions between the carbonates and the nitrates in the glass additives. A small amount of the foaming can also be attributed to reaction between the organics in the resin and the nitrates. For the second demonstration, the carbonate from the calcium additive was replaced by hydroxide and the foaming in the feed tank was eliminated. However, foaming was seen in the melter because the conditions were too oxidizing. This indicated that the amount of nitrates added was too high for the amount of resin added. Therefore, some ferric oxide could be substituted for the ferric nitrate or higher amount of resin could possibly be added. In lab studies, ⅔ of the ferric nitrate was substituted without hindering the redox state of the glass.

The waste loadings demonstrated were 42 g and 50 g of resin per 100 g of vitreous product or 30 wt % and 33 wt %, respectively. These represented waste volume reductions of 60% and 64%. Surrogate radionuclide retentions were much higher in the melter demonstrations. In both demonstrations, almost 100% retention of Cs was seen. Sr retention in the first demonstration, and Mn retention in the second demonstration, were also almost 100%. Co retention, on the other hand, was approximately 43% for the first demonstration and approximately 93% for the second.

The demonstrations showed that vitrification using the iron-enriched borosilicate composition was feasible and little wear on the melter or offgas system was seen.

The invention having been described above, various modifications and equivalents thereof will become apparent to those of skill in the art and are intended to be encompassed by the appended claims.

What is claimed is:

1. A process for directly vitrifying an organic ion exchange resin having metal ions adsorbed thereon, comprising:
    adding borosilicate glass formers and an oxidizer selected from the group consisting of ferric oxide, a ferric oxide producer, and mixtures thereof, to said organic ion exchange resin to form a glass forming mixture;
    directly and continuously heating said glass forming mixture at a substantially constant rate to a temperature of about 1050° C. to about 1150° C. for a time sufficient to form a melt; and
    cooling the melt to form a vitreous solid.

2. The process according to claim 1, wherein said oxidizer is added in an amount sufficient to oxidize said organic ion exchange resin.

3. The process according to claim 2, wherein the oxidizer is ferric oxide.

4. The process according to claim 1, wherein the oxidizer is a ferric oxide producer.

5. The process according to claim 4, wherein the ferric oxide producer is ferric nitrate.

6. The process according to claim 5, wherein the ferric nitrate is present in an amount sufficient to provide oxides and nitrates that oxidize the organic ion exchange resin.

7. The process according to claim 1, wherein said organic ion exchange resin is not pre-treated prior to vitrification.

8. The process according to claim 1, wherein the redox ratio $Fe^{2+}/\Sigma Fe$ is less than 0.33.

9. The process according to claim 1, wherein the ion exchange resin is added to the borosilicate glass formers and oxidizer in an amount ranging from about 38 grams resin to about 70 grams resin based on 100 grams vitreous solid.

10. The process according to claim 1, wherein the ion exchange resin is added in an amount ranging from about 50 grams resin to about 62 grams resin based on 100 grams vitreous solid.

11. The process according to claim 1, wherein the waste loading, calculated as weight of resin introduced divided by the sum of the weight of the glass produced and the introduced waste, is between about 27.5 and about 41.2 wt %.

12. The process according to claim 1, wherein the oxidizer comprises a mixture of ferric oxide and ferric nitrate.

13. The process of claim 1, wherein the heating of said glass forming mixture at a substantially constant rate comprises heating at about 10° C./minute.

14. A process for directly vitrifying an organic ion exchange resin having metal ions adsorbed thereon, comprising:

adding borosilicate glass formers and an oxidizer selected from the group consisting of ferric oxide, a ferric oxide producer, and mixtures thereof, to said organic ion exchange resin to form a glass forming mixture;

heating said glass forming mixture to a temperature and for a time sufficient to form a melt; and cooling the melt to form a glass composition, wherein the glass composition comprises immobilized organic ion exchange resin and:
about 8 to about 16 wt % $B_2O_3$,
about 10 to about 15 wt % CaO,
about 16 to about 22 wt % $Fe_2O_3$,
about 8 to about 14 wt % $Na_2O$,
about 41 to about 49 wt % $SiO_2$.

15. The process according to claim 14, wherein the glass composition comprises:
about 9 wt % $B_2O_3$,
about 15 wt % CaO,
about 22 wt % $Fe_2O_3$,
about 8 wt % $Na_2O$,
about 46 wt % $SiO_2$.

16. A process for directly vitrifying an organic ion exchange resin having metal ions adsorbed thereon, comprising:

adding borosilicate glass formers comprising CaO provided by adding $Ca(OH)_2$ and an oxidizer selected from the group consisting of ferric oxide, a ferric oxide producer, and mixtures thereof, to said organic ion exchange resin to form a glass forming mixture;

directly and continuously heating said glass forming mixture at a substantially constant rate to a temperature and for a time sufficient to form a melt; and cooling the melt to form a vitreous solid.

* * * * *